May 7, 1957 W. H. SPRAGUE 2,791,339
UNLOADING VEHICLE

Filed July 5, 1955 2 Sheets-Sheet 1

INVENTOR.
WILLIAM H. SPRAGUE
BY
Ivan D. Tefft
ATTY

May 7, 1957 W. H. SPRAGUE 2,791,339
UNLOADING VEHICLE
Filed July 5, 1955 2 Sheets-Sheet 2
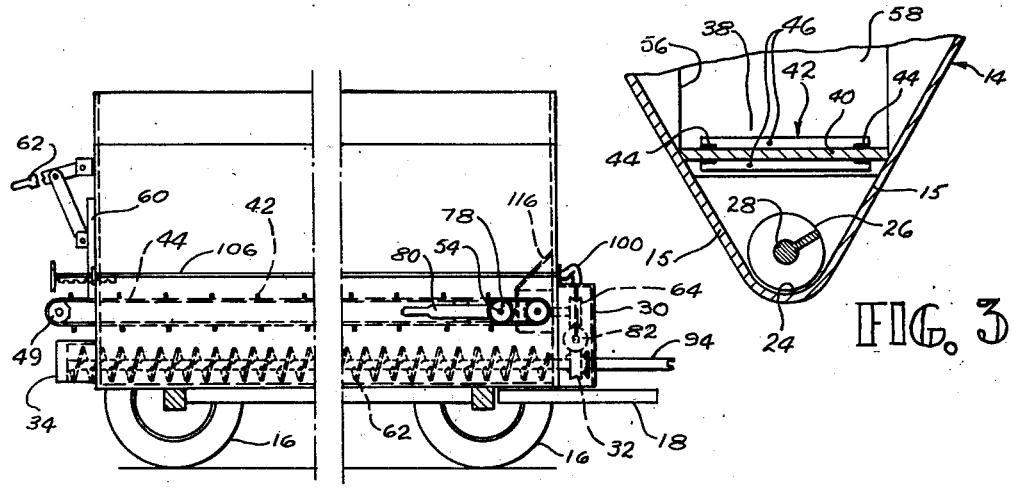
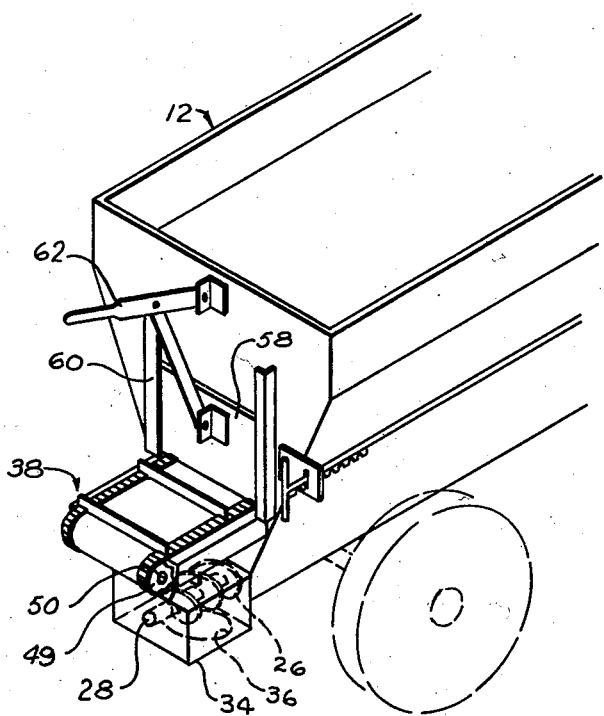
INVENTOR.
WILLIAM H. SPRAGUE
ATTY.

United States Patent Office 2,791,339
Patented May 7, 1957

2,791,339
UNLOADING VEHICLE

William H. Sprague, Janesville, Wis.

Application July 5, 1955, Serial No. 519,910

3 Claims. (Cl. 214—83)

The present invention relates to unloading vehicles, sometimes known as conveyor wagons.

Unloading vehicles heretofore known have had limited utility in that they are not adaptable to use with materials of widely different kinds. Unloading vehicles find common use on the farm, and in such cases are used for carrying and unloading such different kinds of materials as forage and grain. The same kind of conveyor or unloading device is not efficient for these kinds of materials and as a consequence a conveyor wagon as heretofore made would be useful for only one of such kinds, and if it were desired to provide for handling the several different kinds of materials, it would of course be necessary to have two or more such vehicles, at consequent great expense.

An object therefore of the invention is to provide a conveyor wagon or unloading vehicle capable of accommodating and handling widely different kinds of materials.

Another object is to provide a vehicle of the general character noted having a plurality of conveyors, or equivalent devices, for unloading the material carried in the vehicle, of such construction and character as to be conditionable for rendering the conveyors selectively operable according to the character of the material to be carried in the vehicle.

A further object is to provide a conveyor wagon or unloading vehicle having a plurality of conveyors for unloading materials from the vehicle, in which at least one of the conveyors is removably mounted, and arranged so that when it is so mounted it assumes the support of the material in the vehicle and is capable of unloading the material, and when it is removed therefrom, another conveyor becomes so operative.

A still further object is to provide a conveyor wagon or unloading vehicle having a plurality of unloading conveyors, and novel means for transmitting power selectively to the conveyors.

Another object of the invention, in its broader aspects, is to provide an unloading vehicle having a novel form of unloading conveyor removably mounted therein, of such character that the vehicle can effectively and advantageously be utilized without such conveyor therein.

Other objects and advantages will appear from the following detail description taken in conjunction with the accompanying drawings in which—

Figure 3 is a vertical transverse sectional view of the vehicle, viewed toward the rear;

Figure 4 is a perspective view of the rear portion of the vehicle; and

Figure 5 is a side view of the vehicle.

Figure 1:
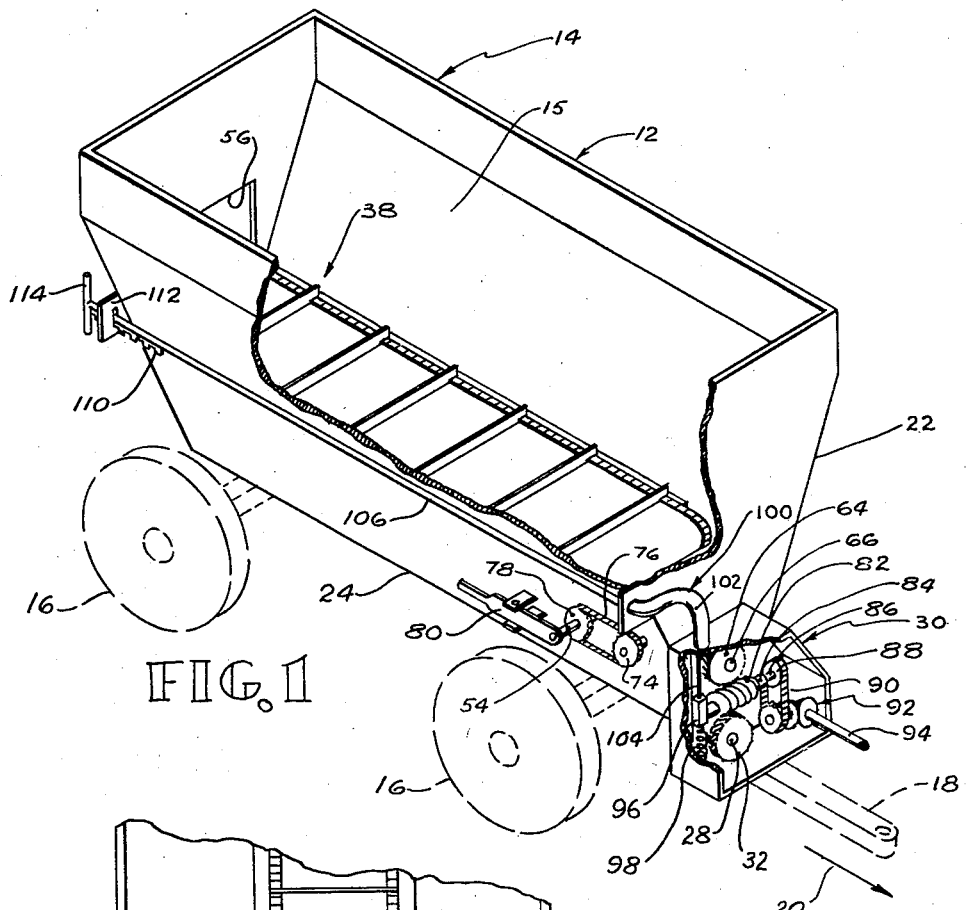
Figure 1 is a perspective view, with a portion broken away, of a vehicle embodying the principles of the invention.
Figure 2:
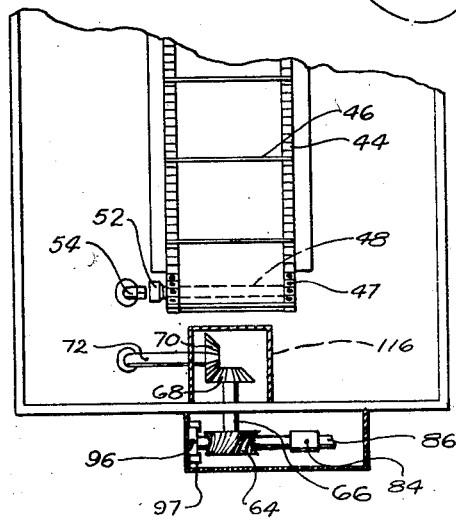
Figure 2 is a plan view of the front portion of the vehicle, with a portion broken away.

Referring in detail to the drawings, a preferred form of device is disclosed embodying the principles of the invention. The disclosed device is in the form of a wagon commonly used on a farm. Such a vehicle in use on a farm may be used quite often for hauling grain (shelled corn, oats, etc.), but it may also be desired to use the vehicle for hauling forage (ensilage, chopped corn, etc.). A single unloading vehicle is not suitable for efficient hauling and unloading such diverse kinds of materials in view of the fact that a single form of unloading conveyor is not suitable for use therewith. The present device utilizes a plurality of conveyors, each for a different kind of material. The wagon 12 includes a box 14 mounted on conventional wheel-and-axle means 16 and is provided with a tongue 18, the forward direction of movement of the vehicle being indicated by the arrow 20.

The vehicle box may be of any desired overall dimensions in accordance with the intended capacity thereof, but the lower portion preferably is of tapered form, as at 22, its side walls converging downwardly and terminating at its lower portion in the form of a relatively narrow trough 24 extending in fore-and-aft direction. The trough may be actually rounded in its lower surface (Fig. 3) to accommodate a screw conveyor or auger 26, although the trough may be of other specific shapes. The auger constitutes a fixed, or built-in, conveyor in the wagon and becomes effective depending upon whether the second and removable conveyor is in the wagon, as will be described in detail later. The auger 26 includes a central shaft 28 suitably mounted in the vehicle box for rotation, as driven by operating means to be described fully hereinafter. The forward end of the central shaft 28 is mounted in a suitable bearing in the front end wall of the box and it projects therethrough into a gear box 30 mounted on the front end of the vehicle. Mounted on the outer end of the shaft, within the gear box, is a gear 32. This gear is preferably a worm gear and it bears certain definite relation to the other elements in the gear box, as will be pointed out in detail later. The rear end of the auger or conveyor terminates adjacent the rear end of the vehicle box, and is disposed for discharging material through an opening in the box. The specific form of mounting for the rear end of the auger may take any of various forms, but I prefer to provide an extension 34 communicating with the interior of the vehicle box proper and into which the auger or conveyor projects. The rear end of the shaft 28 is suitably mounted in a wall of the extension, and the extension is provided with a bottom opening 36 through which the material is discharged from the vehicle box upon rotation of the auger.

The box and auger thus described are adapted to hauling and unloading material such as grain (shelled corn, oats etc.). The auger or screw type of conveyor is well adapted to use with such materials, as is well known. If preferred a top wall or baffle may be provided in overlying relation to the auger and having a smaller and controllable opening for flow of the material therethrough into the auger. However the latter feature may be of known construction and is optional and does not enter into the relation between the present conveyor and the second conveyor to be presently described.

The second conveyor, indicated in its entirety at 38, is supplemental in nature and is arranged for easy insertion into and removal from the vehicle box, and is used or not used according to the character of the material to be carried. The conveyor 38 is of the endless belt type, including a central panel 40 disposed horizontally and an endless belt 42 mounted thereon. The "belt" is preferably of the chain-slat construction, having a pair of side chains 44 with slats or cleats 46 connected at intervals to the links of the chains. The chains are trained over sprockets 47 and 49 on shafts 48 and 50, respectively, mounted in suitable bearings in the ends of the panel. The shaft 48 at the front end is a drive shaft, being provided with a socket 52 for detachably receiving the inner end of a shaft 54 slidably mounted in the side wall of the box. The socket and shaft are of similar polygonal shape for transmitting drive therebetween. This connection, to be referred to again later, enables easy connection and disconnection of the conveyor upon its insertion in and removal from the vehicle box.

The panel 40 preferably rests on the sloping side walls 15 of the box and receives its support solely therefrom. If desired, the side edges of the panel may be of inclined shape, at least partially, so as to closely fit the sloping side walls and prevent shifting or sliding or rocking about a longitudinal axis. The panel, and hence the conveyor, occupy substantially the entire length and breadth of the box at its location and thus forms a bottom to the box. It serves as a false bottom, receiving the entire load of the material placed in the box above it when it is in place therein, and in that condition it serves as though the lower conveyor were non-existent.

The upper conveyor 38 projects rearwardly through an opening 56 in the rear end wall of the vehicle box and preferably projects beyond the extension 34 below it so that the material discharged by the upper conveyor clears the extension. The opening 56 is adjustably closed by a closure 58 of suitable form, such as a vertically sliding door as shown, being retained by side slides 60 and having a control handle 62 of conventional form. The door 58 may be positioned for opening wider or closing down the opening to control the rate of discharge of the material by the conveyor, and it may be lowered to completely close the opening when the conveyor is removed from the vehicle, similarly it may be closed down on the conveyor 38 so as to close the opening when that conveyor is in place, and prevent loss of material through the opening when the conveyor is not operating but the vehicle travelling.

The upper conveyor 38 is suitable for discharging or unloading such material as forage (ensilage, chopped corn, etc.), of quite different nature than the other material mentioned. Upon movement of the conveyor belt or chain 42 the slats 46 carry the material through the rear opening in discharging function, the construction adapting itself readily to materials of quite rough or large-grain nature, in contrast to the capabilities of the lower conveyor or auger 26, and in corollary, it is pointed out a conveyor of the type of the lower conveyor is more effective and efficient for use with grains of the character mentioned. The upper conveyor can be inserted in and removed from the vehicle with a minimum of adjustments, the only adjustments being merely adjustment of the door 58 and connection of the shaft-socket 54—52. The conveyor is put in place merely by placing it in the box and letting it rest on the sloping side walls.

The drive for the conveyors includes an arrangement for selectively putting the conveyors in gear, according to whether the upper conveyor is in place and to be used in unloading, or is absent from the vehicle and the lower conveyor is to be operated for unloading. Referring again to the gear box 30, this contains portions of driving and driven elements for the two conveyors, one of which is the gear 32, mentioned above, and used in operating the lower conveyor 26. Forming a companion to the gear 32 is a gear 64, also preferably a worm gear.

The gear 64 is disposed in certain relation to the gear 32, as will be explained in detail later, and connected in a chain of elements constituting a drive for the upper conveyor. This chain of elements may be located and connected in any of various convenient positions one of which as illustrated includes a shaft 66 on one end of which the gear is mounted. The shaft may conveniently be journalled in a bearing in the end wall of the vehicle box and have on its inner end a bevel gear 68 in mesh with a similar bevel gear 70 on a shaft 72 mounted in a bearing in a side wall of the box and extending to the exterior. On the outer end of the latter shaft is a sprocket 74 having a chain 76 trained over it and another sprocket 78 mounted on or in operative relation to the shaft 54 referred to above. This specific mounting may take any of several forms, such as the sprocket being mounted in a bearing in the side wall of the box and the shaft mounted for sliding movement therein, but rotatable by the sprocket. Polygonal shape of the shaft and sprocket opening will accomplish the rotation, the polygonal shape being embodied in the socket 52 so that upon insertion of the end of the shaft into the socket, rotation of the shaft will be transmitted to the socket and conveyor belt. The shaft may be slid through the sprocket by convenient means such as an actuating lever 80 pivotally mounted on the exterior of the box and having one end suitably connected with the shaft.

The drive is imparted to the respective gears 32, 64 by a worm 82 positioned between the gears and mounted for movement selectively into mesh with the gears, the gears being spaced apart the appropriate distance and being otherwise positioned to accomplish the purpose. The worm 82 is mounted on a universal joint 84 on a shaft 86 suitably mounted and having a sprocket 88 driven by a chain 90 in turn driven by sprocket-gearing 92. The latter is provided with a power take-off shaft 94 leading forwardly from the gear box and positioned for drive by the tractor drawing the vehicle.

The worm 82 is arranged with its end opposite the universal joint swingable in vertical direction so that it can be brought into mesh with the gears 32 and 64. This kind of mounting may conveniently take the form of a block 96 having a bearing receiving the end of the shaft and confined in a guide 97 mounted on the wall of the gear box. A spring 98 biases the block downwardly, while a shifting device 100 is connected with the block for shifting the worm into mesh with the respective gear. This shifting device may be in the form of a Bowden wire including a flexible sleeve 102 fixed at its ends and having a flexible inner element 104 connected at one end to the bearing block and at its other end to an actuating element 106 preferably in the form of a rod leading to the rear of the vehicle. The rod has a rack 110 with teeth engageable in a slot in a bracket 112 and a terminal hand grip element 114. The rod is slidably mounted, the sliding movement effecting similar sliding movement of the flexible element 104 which in turn shifts the worm 82. The direction of sliding determines which conveyor is placed in driving connection, i. e., upon rearward movement of the rod, the worm is brought into mesh with the worm gear 64, and upon forward movement, with the worm gear 32. The gears 32 and 64 are spaced apart so that the worm may be positioned between them, in neutral position out of mesh with either gear. The extension of the rod 106 to the rear enables the operator to control the operation of the conveyor while he is in position at the rear to observe the discharge of material. The rack 110 and bracket 112 enable the operator to lock the control rod in the position to which it is shifted.

Suitable means such as a shield 116 is provided for covering the gears 68, 70.

The vehicle of the invention provides means for carrying and unloading materials of widely different kinds. It is easily and quickly conditioned for handling the different materials. The vehicle requires a bare minimum of adjustment for preparing it for the different materials; the upper conveyor is emplaced by merely setting it in the box on the sloping walls, and moving the driving shaft 54 inwardly. It is removed merely by similar steps in reverse order. The vehicle box requires no special conditioning or construction to prevent the upper conveyor from rocking or shifting sidewise. Simple and rugged means is provided for shifting the drive from one conveyor to the other, as well as for shifting either conveyor into and out of gear.

It will be understood that changes may be made in the specific form illustrated within the scope of the following claims.

I claim:

1. An unloading vehicle comprising a box, a first conveyor in the bottom of the box for conveying material out of the box, a second conveyor removably mounted in the box above the first conveyor for conveying material out of the box and forming a bottom to the box, power transmitting means including a gear box, a power take-off shaft and worm driven thereby in the gear box, the worm being mounted at one end in a universal joint and having its other end mounted for swinging movement, a pair of driven elements one connected with the first conveyor and the other detachably connected with the second conveyor, the driven elements including worm gears disposed on opposite sides of the worm, and a Bowden wire manual actuator having a hand grip externally of the vehicle connected with the swinging end of the worm and operable for moving the worm into mesh alternatively with the worm gears.

2. An unloading vehicle comprising a box for containing material to be carried, a first conveyor for conveying material out of the box, a second conveyor for the same purpose removably mounted above the first conveyor and forming a bottom to the box, the second conveyor including a panel and an endless belt thereon and shafts one of which is a drive shaft for drivingly mounting the belt, the drive shaft having a socket at one end, power transmitting means on the vehicle including a power input element and means for selectively connecting the input element with the conveyors, the connection to the second conveyor including a rotatable shaft mounted in a wall of the box for sliding movement into and out of the socket in the drive shaft, the shaft and socket having complementary polygonal shape.

3. An unloading vehicle comprising a box having a tapered bottom portion, a screw conveyor in the bottom of the box having a drive shaft extended through the front end and a gear on its front end and rear end of the conveyor adjacent an opening in the box for discharging material from the box therethrough, a second conveyor including a horizontal panel and an endless belt thereon with shafts one of which is a drive shaft drivingly mounting the belt, the drive shaft having a socket adjacent a wall of the box, the second conveyor being removably mounted in the box above the screw conveyor and forming a bottom to the box and projecting through an opening in the rear of the box, a drive shaft mounted in a wall of the box and so positioned for sliding movement into and out of said socket and the shaft and socket being of complementary polygonal shape, means for driving said drive shaft terminating in a gear, a gear box mounted on the front end of the vehicle box and containing the two said gears in prepositioned spaced relation, a power take-off shaft mounted in the gear box and extending forwardly therefrom, a driving gear mounted in the gear box connected with the power take-off shaft and positioned between the said gears for movement respectively into and out of mesh therewith, and manually controlled actuating means for so moving the driving gear and having a hand grip adjacent the rear end of the vehicle.

References Cited in the file of this patent
UNITED STATES PATENTS

| | | |
|---|---|---|
| 1,928,859 | Kutscha | Oct. 3, 1933 |
| 1,954,703 | Klein | Apr. 10, 1934 |
| 2,104,191 | Flynn | Jan. 4, 1938 |
| 2,290,950 | Duncan | July 28, 1942 |
| 2,293,977 | Hoffstetter | Aug. 25, 1942 |
| 2,687,285 | Fisher | Aug. 24, 1954 |
| 2,769,525 | Herscovitch | Nov. 6, 1956 |
| 2,769,526 | Herscovitch | Nov. 6, 1956 |